United States Patent [19]
Ritter et al.

[11] 3,837,806
[45] Sept. 24, 1974

[54] METHOD OF ANALYZING COATINGS ON PARTICULATE MATERIAL

[75] Inventors: James R. Ritter, Ridgewood; Otto R. Strauch, Wyckoff, both of N.J.

[73] Assignee: Potters Industries Inc., Carlstadt, N.J.

[22] Filed: Sept. 5, 1972

[21] Appl. No.: 286,060

[52] U.S. Cl. ........... 23/230 R, 23/230 M, 117/62.1, 117/66, 117/100 S
[51] Int. Cl. .... G01n 31/22, B44d 1/44, C03d 17/28
[58] Field of Search ...... 23/230 M, 230 R; 252/408; 117/100 S, 66, 62.1, DIG. 2

[56] References Cited
UNITED STATES PATENTS

| | | | |
|---|---|---|---|
| 3,110,614 | 11/1963 | de Vries | 117/100 S |
| 3,537,882 | 11/1970 | Wiggill | 117/100 S |
| 3,656,908 | 4/1972 | Noll et al. | 23/230 R |
| 3,661,628 | 5/1972 | Marsden | 117/126 GS |

OTHER PUBLICATIONS

Fiegl–Spot Test in Organic Analysis–6th Ed. pp. 276–279–1960, Elsevier Publishing Co.

Hopkin & Williams LTD–Organic Reagents for Organic Analysis, 2nd ed., pp. 57, 1950, Pub.–Hopkin & Williams LTD, England.

*Primary Examiner*—Joseph Scovronek
*Assistant Examiner*—Michael S. Marcus
*Attorney, Agent, or Firm*—Lee C. Robinson, Jr.

[57] ABSTRACT

A method of analyzing molecular layers of an amino silane coupling agent on glass spheres, in which a saturated solution of 1-chloro-2,4 dinitrobenzene in methyl alcohol is added to a sample of the spheres without substantial agitation, and the materials are then heated to a temperature sufficient to react the 1-chloro-2,4 dinitrobenzene with the coupling agent. The yellow color of the reaction product is compared with successive color standards representative of known thicknesses of the silane layers to determine the thickness of the layers on the spheres being analyzed.

13 Claims, No Drawings

METHOD OF ANALYZING COATINGS ON PARTICULATE MATERIAL

BACKGROUND OF THE INVENTION

This invention relates to the analysis of organic coating materials on nonporous inorganic substrates, and more particularly to a method of analyzing molecular layers of amine type coupling agents on glass spheres and similar discrete particles.

The present invention, while of general application, is particularly well suited for use in the qualitative and quantitative analysis of amino functional group silane coatings on small glass spheres. Coatings of this type are commonly applied to the spheres to enhance the bonding of the inorganic glass substrate to resinous materials. In cases in which the spheres are to be used as fillers in nylon, polyphenylene oxide or other polymers, for example, the coating improves the dispersibility of the glass in the resin and provides positive adhesion therebetween.

The amount of coupling agent applied to the individual glass spheres must be carefully controlled. The spheres are unique because of their nonporous surface and small size, small glass spheres typically ranging between 6 and 100 microns in diameter. Each sphere must be completely coated with at least one molecular layer of coupling agent to provide a satisfactory bond. If the thickness of the coating exceeds about five molecular layers, however, there is too great a quantity of coupling agent to provide an effective bond, manifesting itself in less satisfactory physical properties of the end product, and in addition the excess material is wasted.

Heretofore, difficulties have been encountered in analyzing these small amounts of coupling agents on glass spheres and other nonporous inorganic substrates. Conventional analytical techniques have proved deficient particularly in the measurement of coupling agents from both the qualitative and quantitative standpoint, and the low sensitivity, inaccuracy and high cost of such techniques has rendered them impractical in the analysis of the coupling agents used in many present day bead coating systems. The problems encountered with the testing procedures previously employed have been of special moment in the manufacture of coated beads on an industrial mass-production basis, with the result that the end product occasionally exhibited a coating that was too thin to provide the desired coupling action or that unnecessarily large quantities of the coupling agent were consumed.

SUMMARY

One general object of this invention, therefore, is to provide a new and improved method for analyzing molecular layers of a coupling agent on nonporous inorganic substrates.

More specifically, it is an object of this invention to provide such a method for determining the presence of an amino functional group silane coupling agent on glass spheres and similar discrete particles.

Another object of the invention is to provide a method of the character indicated which enables the qualitative and quantitative measurement of amino type coupling agents on the spheres.

Still another object of the invention is to provide a method of evaluating amino silane coupling agents on glass spheres which method may be quickly and easily performed in a rapid and inexpensive manner.

In a preferred embodiment of the invention, a test sample is prepared of coated glass spheres. A saturated solution of 1-chloro-2,4 dinitrobenzene in methyl alcohol is added to the sample, and care is taken to avoid substantial agitation. The solution and the sample are heated to a temperature sufficient to react the 1-chloro-2,4 dinitrobenzene with amine type coupling agents and produce a yellow reaction product, indicating the presence of the amine in the coating. The intensity of the yellow color is compared either visually or optically with successive known color standards representing amine coatings of acceptable and unacceptable thicknesses.

Depending upon the number and range of the standards used, the method can differentiate among zero, one-half, one, two, five, ten as well as numerous other molecular layers of the coating agent on the spheres. It may be rapidly performed and is readily usable as a routine quality control procedure in the commercial manufacture of coated glass spheres and other discrete particles without the need for elaborate laboratory apparatus.

The present invention, as well as further objects and features thereof, will be understood more clearly and fully from the following description of certain preferred embodiments.

DESCRIPTION OF CERTAIN PREFERRED EMBODIMENTS

In a preferred embodiment of the invention, the coupling agent to be analyzed is in the form of a gamma-aminopropyltriethoxy silane coating on glass spheres. Coatings of this type exhibit particular affinity for the polymeric materials with which the spheres are to be used. The invention is also applicable to the detection of amine coupling agents on fiber glass and fillers as well as other particulate substrates, however, and it is highly advantageous in the detection of the amino functional group silanes. The particular coupling agent used will depend on the purpose and properties of the material to which the substrate is to be added.

The spheres to be analyzed should be of a uniform size range, particularly where the readings are to be quantitative as well as qualitative. For best accuracy the spheres should be smaller than 140 mesh U.S. Standard. The presence of an excess quantity of plus 140 mesh spheres may produce an error in the qualitative reading by color comparison with the preselected standards.

A sample of the coated spheres is prepared by selecting the spheres in accordance with standard sampling techniques from a coated and dried production line run. The selected sample is checked for screen size and is then split to obtain a fixed fraction, illustratively 1 gram.

To form the test solution, a measured quantity of 1-chloro-2,4-dinitrobenzene is dissolved in methyl alcohol or other organic solvent. The type of solvent employed preferably comprises one of the lower alkanol solvents, that is, a solvent which contains less than five carbon atoms. Although the quantity used will depend on such factors as the type of solvent and the size of the selected sample, it is important that the solution be fully saturated. In the absence of complete saturation, color variants may occur in the ensuing reaction product which adversely affect the accuracy of the quantitative measurement.

The thus prepared solution is added to the selected sample of glass spheres while avoiding substantial agitation. The amount by weight of solution used advantageously should be about one-half that of the sample. Thus, for a one gram sample particularly good results are achieved by the addition of 1/2 gram of liquid.

The solution and the sample are then heated to a temperature sufficient to react the 1-chloro-2,4-dinitrobenzene with gamma-aminopropyltriethoxy silane. For best results the solution should be maintained at a temperature within the range of from about 60°C. to about 100°C. Below about 60°C., the reaction rate is too slow for many applications, while if the temperature is much above 100°C. an undesirable burning effect takes place with impairs the accuracy of the quantitative analysis. A temperature of about 80°C. is particularly suitable for insuring a complete reaction within a reasonable length of time, say, five minutes.

The reaction which takes place is believed to conform to the following general formula:

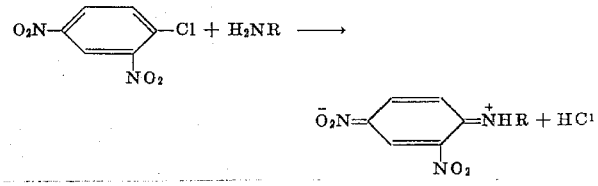

In the above formula R represents the bulk of the coupling agent to which the amine group is attached and can comprise any of a variety of known constituents. Although the formula shows only the reaction of a primary amine with the 1-chloro-2,4-dinitrobenzene, similar reactions occur with coupling agents having secondary and tertiary amine groups. As used herein and in the appended claims, the term "amino functional group" includes the group $-NH_2$ as well as mono and disubstituted amino groups such as $-NHR$ and $-NR_1R_2$, wherein $R_1$ and $R_2$ can be identical or dissimilar and wherein R, $R_1$ and $R_2$ represent any of a variety of groupings attached to the amino nitrogen in conventional coupling agents. Representative amino functional group coupling agents that may be employed include aminoalkyl trimethoxy silane, N (beta-aminoethyl) gamma-aminopropyl trimethoxy silane, triamino alkyl trimethoxy silane, N-bis (beta-hydroxyethyl)-gamma-aminopropyl triethoxy silane, gamma aminopropyl trimethoxy silane, gamma amino propyl triethyl acrylic acid adduct silane and gamma aminopropyl triethoxy silane. These coupling agents are illustrative of a wide variety of commercially available coupling agents with which the invention may be used.

The quinoidal zwitterion condensation products produce a distinct yellow color. The intensity of the color varies in accordance with the extent of the reaction and is an indication of the amount of amine coupling agent present in the solution. By comparing the color of the reaction products with successive color standards representative of known quantities of the coupling agent, the amount of coupling agent in the sample may be readily determined.

In a preferred embodiment of the invention three standards are utilized in the form of glass spheres having uniform coatings of one, two and five molecular layers of gamma-aminoproplytriethoxy silane, respectively. The quantity and size of the spheres in each standard should be the same as the quantity and size of the spheres being tested, and the respective thicknesses of the coatings should be accurately determined. The 1-chloro-2, 4-dinitrobenzene solution is added to each of the three standards in the same proportions used for the unknown sample. The standards and the sample are simultaneously heated to produce the above-described reaction, and the color of the reaction products are observed with the standards and the sample in side-by-side relationship with one another.

By contrasting the color of the unknown sample with that of the successive standards, the presence and approximate thickness of the gamma-aminopropyltriethoxy silane on the sample may be readily ascertained. The absence of a yellow color in the reaction products indicates that the spheres of the sample do not have an amine type coating. If a yellow color is observed but its intensity is less than the one molecular layer standard, the coating on the sample is of the amine type but is less than one molecular layer in thickness. If the yellow intensity of the sample lies between the intensity of the one, two and five molecular layer standards, the thickness of the sample's amine coating may be bracketed accordingly, while if the observed color is a more intense yellow than the five molecular layer standard the coating thickness is above five molecular layers.

For most present-day applications the thickness of the amine coating on the spheres should be greater than one but less than five molecular layers. If the coating thickness is less than one molecular layer there is an insufficient bond between the glass and the polymer, while a thickness in excess of five molecular layers similarly prevents a strong glass-polymer bond and represents a wastage of the coating material. For best results the thickness of the coating should be maintained at about two molecular layers.

The following examples are set forth in illustration of this invention and should not be construed as a limitation thereof. Unless otherwise indicated, all parts and percentages given are by weight.

EXAMPLE 1

15 grams of 1-chloro-2, 4-dinitrobenzene were placed in an 8 ounce bottle, and the bottle was filled with methyl alcohol. The bottle and contents were agitated for one minute, and an excess of solid was observed at the bottom of the bottle, indicating that the alcohol was fully saturated.

Four one gram fractions of coated glass spheres were placed in separate test tubes. Three of the fractions were coated with a gamma-aminoproplytriethoxy silane coupling agent having a respective thickness of one, two and five molecular layers. The fourth fraction had a gamma-aminopropyltriethoxy silane coating of unknown thickness. The spheres in each of the fractions were of soda-lime-silica glass and exhibited a particle size within the range of from 6 to 60 microns.

Ten drops of the 1-chloro-2, 4-dinitrobenzene solution were placed in each of the four test tubes without shaking or mixing, and the tubes were heated to a temperature of 80°C. for five minutes. The heat was then removed, and after allowing an additional five minutes for the tubes to cool the color of the reaction products was visually compared. The products in each of the tubes exhibited a yellow color, and the intensity of the color in the tube containing the unknown sample closely approximated that in the tube containing the two molecular layer fraction, was more intense than that in the tube containing the one molecular layer fraction, and was less intense than in the tube containing the five molecular layer fraction. The results of the test indicated the presence of an amine type coupling agent on the unknown sample and that the thickness of the coupling agent was approximately two molecular layers.

EXAMPLE II

The procedure of the foregoing example was repeated at successive temperatures of 70°C., 90°C. and 100°C. In each case a distinct yellow color was observed, and the intensity of the color in the test tube containing the sample of unknown thickness was readily distinguishable from that in the other three tubes.

EXAMPLE III

This example illustrates that the foregoing test procedure is not effective at temperatures outside a particular range. The procedure of Example 1 was repeated at room temperature (23°C.), but no observable reaction took place in any of the tubes. At a temperature of 150°C., an undesirable burning of the coating occurred which made it difficult to distinguish between the color of the products in the tubes.

EXAMPLE IV

The Example 1 procedure was repeated except that the 1-chloro-2, 4-dinitrobenzene was dissolved in ethyl alcohol. The results of the test were the same as in Example 1.

EXAMPLE V

This example illustrates the ineffectiveness of the test with coupling agents which are not of the amine type. The procedure of Example 1 was repeated except that the unknown spheres were coated with an epoxy silane in a first test run and with an acrylic in a succeeding run. In both cases the coating on the spheres was known to have a thickness in excess of one molecular layer, but no yellow color was observed in the test tubes containing the spheres in question.

Although the invention has been described with particular reference to a color comparison by visual observation, it will be readily apparent that such a comparison also may be made through the use of optical apparatus. As an illustration, light of standard intensity may be passed through the standards and the sample being analyzed, and the intensity of the light may be detected and measured by a photoelectric colorimeter, for example. A comparison of the relative intensities enables a precise determination of the thickness of the coupling agent on the sample.

The terms and expressions which have been employed are used as terms of description and not of limitation, and there is no intention, in the use of such terms and expressions, of excluding any equivalents of the features described, or portions thereof, it being recognized that various modifications are possible within the scope of the invention claimed.

What is claimed is:

1. A method of determining the thickness of molecular layers of an amino type coating on an inorganic particulate substrate, which comprises:
    preparing a sample of the substrate having a thin essentially uniform silane coating containing an amino functional group;
    forming a saturated solution of 1-chloro-2,4-dinitrobenzene in a lower alkanol solvent;
    adding the solution to the sample;
    heating the solution and the sample to a temperature sufficient to react the 1-chloro-2,4-dinitrobenzene with the amino functional group on the sample and to obtain a colored reaction product; and
    comparing the color of the reaction product with a color standard, to determine the thickness of amino type coating on the sample.

2. A method as defined in claim 1, in which the coating is gamma-aminopropyltriethoxy silane.

3. A method as defined in claim 1, in which the solution and the sample are heated to a temperature which lies within the range of from about 60°C. to about 100°C.

4. A method of determining the thickness of molecular layers of an amino type coupling agent on glass spheres, which comprises:
    preparing a sample of glass spheres coated with a thin essentially uniform layer of a coupling agent containing an amino functional group;
    forming a solution of 1-chloro-2,4-dinitrobenzene in an organic solvent;
    adding the solution to the sample of coated spheres while avoiding substantial agitation;
    heating the solution and the sample to a temperature sufficient to react the 1-chloro-2,4-dinitrobenzene with the amino type coupling agent on the sample and to obtain a colored reaction product; and
    comparing the color of the reaction product with a color standard, to determine the thickness of amino type coupling agent on the sample.

5. A method as defined in claim 4 in which the size of the glass spheres is less than 140 mesh U.S. Standard.

6. A method as defined in claim 4, in which the color of the reaction product is compared with successive color standards representative of known thicknesses of the amino type coupling agent on the spheres.

7. A method as defined in claim 4, in which the coupling agent is an amino functional group silane.

8. A method of determining the thickness of molecular layers of an amino type coupling agent on glass spheres, which comprises:
    preparing a sample of glass spheres coated with an essentially uniform molecular layer of gamma-aminopropyltriethoxy silane;
    forming a saturated solution of 1-chloro-2,4-dinitrobenzene in a hydrocarbon solvent;
    adding the solution to the sample of coated spheres in a ratio of one-half gram of solution to one gram of sample;
    heating the solution and the sample to a temperature within the range of from about 60°C. to about 100°C. to react the 1-chloro-2,4-dinitrobenzene with the gamma-aminopropyltriethoxy silane and obtain a colored reaction product;
    and comparing the color of the reaction product with a color standard, to determine the thickness of the silane amine type coupling agent on the sample.

9. A method as defined in claim 8, in which the solution and the sample are heated to a temperature of about 80°C.

10. A method as defined in claim 8, in which the hydrocarbon solvent is methyl alcohol.

11. A method as defined in claim 10, in which the size of the glass spheres ranges between about 6 to about 100 microns.

12. A method of determing the thickness of molecular layers of an amino type coupling agent on glass spheres, which comprises:
preparing a sample of glass spheres having a diameter in the range of about 6 to about 100 microns, said spheres having an essentially uniform coating of gamma-aminopropyltriethoxy silane;
forming a saturated solution of 1-chloro-2,4-dinitrobenzene in methyl alcohol solvent;
adding the solution to the sample of coated spheres in a ratio of one-half gram of solution to one gram of sample;
heating the solution and the sample to a temperature within the range of from about 60°C. to about 80°C. for about five minutes to react the 1-chloro-2,4-dinitrobenzene with the gamma-aminopropyltriethoxy silane and to form a characteristic yellow colored reaction product; and
comparing the color of the reaction product with successive color standards representative of known thicknesses of the gamma-aminopropyltriethoxy silane coating on the said size glass spheres.

13. A method of determining the thickness of molecular layers of an amino type coating on glass substrates, which comprises:
preparing a sample of glass substrate having a specified size, said substrate having an
essentially uniform layer of said amine coating;
forming a solution of specified concentration of a reagent capable of reacting with said amine coating and capable of forming a characteristically colored reaction product;
adding a predetermined amount of said reagent to a predetermined amount of said sample of coated substrate;
reacting said amine coating with said reagent to obtain a colored reaction product; and
comparing the color of the reaction product with successive color standards representative of known thicknesses of said amine coating on the specified size substrate.

* * * * *